United States Patent [19]

Cooper et al.

[11] 4,263,426

[45] Apr. 21, 1981

[54] PROCESS FOR ISOLATION OF POLYPHENYLENE ETHER RESIN BY CRUMBING IN HOT WATER

[75] Inventors: Glenn D. Cooper, Delmar; Daniel E. Floryan, Glenmont, both of N.Y.

[73] Assignee: General Electric Company, Pittsfield, Mass.

[21] Appl. No.: 957,802

[22] Filed: Nov. 6, 1978

[51] Int. Cl.³ .................... C08G 65/44; C08G 65/46
[52] U.S. Cl. .................................. 528/486; 528/212; 528/485; 528/487; 528/488; 528/491; 528/492; 528/495; 528/499; 528/500
[58] Field of Search ............... 528/499, 212, 485, 486, 528/487, 488, 491, 492, 495, 500

[56] References Cited

U.S. PATENT DOCUMENTS

| | | | |
|---|---|---|---|
| 2,769,804 | 11/1956 | Hanson . | |
| 2,971,939 | 2/1961 | Baer | 260/45.5 |
| 3,219,626 | 11/1965 | Blanchard et al. | 528/212 |
| 3,257,357 | 6/1966 | Stamatoff | 528/212 |
| 3,257,358 | 6/1966 | Stamatoff | 528/212 |
| 3,306,874 | 2/1967 | Hay | 528/212 |
| 3,306,875 | 2/1967 | Hay | 528/212 |
| 3,336,267 | 8/1967 | Zimmerman et al. . | |
| 3,337,499 | 8/1967 | Arnhem | 528/212 |
| 3,342,892 | 9/1967 | Laakso et al. | 528/212 |
| 3,344,116 | 9/1967 | Borman | 528/212 |
| 3,356,761 | 12/1967 | Fox | 528/212 |
| 3,382,212 | 5/1968 | Price et al. | 528/212 |
| 3,383,435 | 5/1968 | Cizek | 528/212 |
| 3,384,619 | 5/1968 | Hori et al. | 528/212 |
| 3,440,217 | 4/1969 | Faurote et al. | 528/212 |
| 3,442,885 | 5/1969 | Wieden et al. | 528/212 |
| 3,455,880 | 7/1969 | Kobayashi et al. | 528/212 |
| 3,573,257 | 3/1971 | Nakashio et al. | 528/212 |
| 3,630,995 | 12/1971 | Modan | 528/212 |
| 3,663,661 | 5/1972 | Katchman | 528/212 |
| 3,783,147 | 1/1974 | Calicchia et al. | 528/212 |
| 3,838,102 | 9/1974 | Bennett et al. | 528/499 |
| 3,914,266 | 10/1975 | Hay | 260/438.1 |
| 3,943,191 | 3/1976 | Cooper et al. | 528/212 |
| 3,970,640 | 7/1976 | Yonemitsu et al. | 528/212 |
| 4,048,143 | 9/1977 | Hay et al. | 528/212 |
| 4,059,568 | 11/1977 | Cooper | 528/212 |
| 4,092,294 | 5/1978 | Bennett, Jr. et al. | 528/212 |
| 4,110,311 | 8/1978 | Cooper et al. | 528/212 |

FOREIGN PATENT DOCUMENTS 785834 5/1968 Canada .
1291609 10/1972 United Kingdom .

*Primary Examiner*—Lester L. Lee
*Attorney, Agent, or Firm*—Morgan, Finnegan, Pine, Foley & Lee

[57] ABSTRACT

An improved method is provided for the recovery of a friable crumb-form of resinous compositions comprising polyphenylene ethers. The method comprises polymerization of a monohydric phenol, removal of the catalyst employed, heating, I.V. stabilization, optionally, capping, and product recovery.

22 Claims, No Drawings

PROCESS FOR ISOLATION OF POLYPHENYLENE ETHER RESIN BY CRUMBING IN HOT WATER

This invention relates to synthetic resins formed from phenols, and more particularly, to separation and recovery of compositions comprising polyphenylene ethers in a crumbform from liquid media used in their manufacture.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al, U.S. Pat. Nos. 3,337,499; Blanchard et al, 3,219,626; Laakso et al, 3,342,892; Borman, 3,344,116; Hori et al, 3,384,619; Faurote et al, 3,440,217; and disclosures relating to metal based catalysts which do not include amines, are known from patents such as Wieden et al, U.S. Pat. Nos. 3,442,885 (copper-amidines); Nakashio et al, 3,573,257 (metal-alcoholate or -phenolate); Kobayashi et al, 3,455,880 (cobalt chelates); and the like. In the Stamatoff patents, the polyphenylene ethers are produced by reacting the corresponding phenolate ion with an initiator, such as a peroxy acid salt, an acid peroxide, a hypohalite, and the like, in the presence of a complexing agent. Disclosures relating to non-catalytic processes, such as oxidation with lead dioxide, silver oxide, etc., are described in Price et al., 3,382,212. All of the above-mentioned disclosures are incorporated herein by reference.

Compositions including a polyphenylene ether component can be chemically and physically combined, and they can be in liquid media in the form of emulsions, solutions, suspension solution combinations, e.g., as disclosed in U.K. Pat. No. 1,291,609, incorporated herein by reference, and the like. Among the most important of such compositions are compositions of polyphenylene ethers with alkenyl aromatic resins, including rubber-modified polystyrene resins, and graft copolymers of polyphenylene ether resins with alkenyl aromatic resins, including styrene homopolymer resins, and the like. These are described, for example, in Cizek, U.S. Pat. No. 3,383,435, which is incorporated herein by reference.

Compositions of polyphenylene ethers and polystyrene or rubber-modified polystyrene can also be prepared by the oxidation of the corresponding phenol, e.g., 2,6-dimethyl phenol in a solution of polystyrene or rubber-modified polystyrene. See, for example, Katchman, U.S. Pat. No. 3,663,661, the disclosure of which is incorporated herein by reference. Reaction mixtures containing graft copolymers of polyphenylene ether resins and styrene resins can also be made by polymerization of vinyl aromatic monomers in the presence of polyphenylene ethers according to, for example, the disclosure of Fox, Canadian Pat. No. 785,834, which is incorporated herein by reference.

In general, all of the above processes produce the polyphenylene ether or resinous composition as a component in a liquid medium, and a common subsequent step is to add a polymer non-solvent to the liquid medium to precipitate the polymer. For example, if the resinous composition is combined in a medium which includes benzene, toluene, xylene, or the like, adding methanol will precipitate the polyphenylene ether. If the resinous composition is in pyridine, adding water will precipitate the resinous composition.

In commonly assigned U.S. patent application Ser. No. 311,837, filed Dec. 4, 1972, now abandoned, incorporated herein by reference, it was disclosed that a composition comprising polyphenylene ether resin can conveniently be isolated from a liquid medium, if one of the liquid components is steam-distillable, by slowly adding to hot water with vigorous agitation. Under these conditions, the steam-distillable component is rapidly removed by steam-distillation, leaving the composition in the form of a friable, easily pulverized, crumb which is suitable after drying for extrusion, compression molding, and the like. Compositions made from rubber-modified polystyrene in combination with polyphenylene ether resin produced by this process have good impact strength and other physical properties but poor color, i.e., they are highly colored. Attempts to reproduce these results with reaction mixtures produced on a commercial scale were unsuccessful as the resulting product had poor color and, when blended with rubber-modified polystyrene, yielded a resin with poor color and with greatly reduced impact strength.

The crumbing process itself, applied to solutions of purified polyphenylene ethers, does not cause reduced impact strength or poorer color when the product is compounded with rubber-modified polystyrene, nor does addition of the low molecular weight by-products, separately isolated, to compositions comprising the polyphenylene ether and the rubber-modified polystyrene cause significant reduction in impact strength. Furthermore, when the polyphenylene ether is isolated from reaction mixtures containing the by-products by total isolation procedures which do not involve water, for example, by spray-drying in a nitrogen atmosphere, compositions with polystyrene do not have reduced impact strength, although color and thermal-oxidative stability are adversely affected. Decolorization by hydrogenation or chemical reduction prior to crumbing can yield products of good color, but usually with lowered impact strength.

It has been found that by combining the heating procedure described herein with intrinsic viscosity stabilization techniques such as those disclosed in Yonemitsu et al., U.S. Pat. No. 3,970,640 and Cooper et al., U.S. Pat. No. 4,110,311, both incorporated herein by reference, crumbed polyphenylene ether resin compositions can be consistently produced which result in compositions also comprising rubber-modified polystyrene, that have excellent impact strength and thermal-oxidative stability and that have tensile strength, heat distortion temperature, and other physical properties equivalent to those of similar compositions comprised of methanol-precipitated polyphenylene ether resin compositions.

The color of the polymer isolated by hot water crumbing after heating in the presence of the stabilizer is better than that of the polymer similarly isolated with no thermal treatment, but inferior to that of polymers isolated by precipitation with methanol or of polymers isolated by crumbing after heating without stabilizer present. Surprisingly, however, compositions comprising rubber-modified polystyrene and polyphenylene ether isolated by hot water crumbing after heating in the presence of the stabilizer have better color than similar compositions made from polyphenylene ether isolated by methanol precipitation without treatment or by crumbing after heating without stabilizer. The color of the first-mentioned compositions is not stable, however, and a green tint develops within a few days. Compositions which were initially white become a light olive color in four to six weeks. Exposure to ultraviolet light such as is provided by a fluorescent blacklight lamp, causes a pronounced pink color within a few hours. The product is, therefore, not suitable for use in white or light-colored formulations where color stability is important.

It has been found that, where color stability is important, it is advisable to add, as a final step prior to crumbing, a capping reaction whereby phenolic hydroxyl groups are converted to acetate groups or other stable groups. Capping need not be complete; compositions made from crumbed polyphenylene ethers in which only two-thirds of the polymeric hydroxyl groups had been capped showed complete color stability, with no detectable change over a period of more than a year. Apparently the structures responsible for color instability react preferentially with the capping agents. Initial colors of the compositions made from polymer crumbed after partial capping are also improved, as well as stability to ultraviolet light. No pink color develops on exposure to fluorescent blacklight, and the rate of photoyellowing is slower than that of compositions made from methanol-precipitated polymers.

It is, therefore, a primary object of this invention to provide an improved method of isolating polyphenylene ether resins by crumbing in hot water.

Another object of this invention is to provide molding compositions and molded articles that are based on polyphenylene ether resins produced by crumbing in hot water and that have improved thermal oxidative stability.

Still another object of this invention is to provide molding compositions and molded articles that are based on polyphenylene ether resins produced by crumbing in hot water and that have improved impact strength.

It is also an object of this invention to provide the above-described, improved molding compositions in reinforced and/or flame-retardant embodiments.

DESCRIPTION OF THE INVENTION

The present invention is directed to an improved process for isolation of polyphenylene ether resins by crumbing in hot water. According to the invention, the polyphenylene ether reaction mixture is subjected to heating in the presence of an intrinsic viscosity stabilizer. The reaction catalyst may be removed either prior to or after this step. The chelated catalyst and any water soluble products derived from the stabilizer are removed, and the polyphenylene ether resin is produced by crumbing. The crumbing step can be preceded by a capping step.

The polyphenylene ethers are prepared by treating a solution of the corresponding phenol, optionally substituted with chlorine, bromine, or iodine in the para-position, with an oxygen-containing gas in the presence of a metal-amine complex catalyst. The metal component can comprise copper, manganese, cobalt, nickel, vanadium, chromium oxides and salts thereof, but copper is preferred. Primary, secondary and tertiary amines may be used as the amine component of the catalyst. The reaction solvent can be halogenated aliphatic solvent, e.g., trichloroethylene, or an aromatic solvent, e.g., benzene, toluene, xylene, chlorobenzene, nitrobenzene, and the like, as well as many others which will be obvious to those skilled in this art. Especially preferred solvents are aromatic hydrocarbons, e.g., toluene or benzene.

The polyphenylene ether-forming reaction can be carried out under a wide variety of well-known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25° to 50° C. The degree of polymerization is primarily controlled by the reaction time, although catalyst activity, promoters, temperature, oxygen flow rate and other parameters have known effects. Further process details are set forth in the Hay patents and in Modan, U.S. Pat. No. 3,630,995 and Calicchia et al, U.S. Pat. No. 3,783,147, the disclosures of which are incorporated herein by reference.

It is desirable, but not essential, that the process conditions be chosen to minimize formation of quinones and other low molecular weight oxidation products. The diamine catalyst system disclosed in Hay, U.S. Pat. Nos. 3,914,266, 4,059,568, and 4,092,294, incorporated herein by reference, tends to result in fewer by-products than other known catalyst systems, and use of that catalyst system is therefore preferred.

At the point where the polymerization reaction reaches the desired degree of polymerization, and the polymer reaches the desired molecular weight, the reaction solution will comprise a solution of polyphenylene ether, typically from 3 to 50% by weight and usually from 10 to 30% by weight, metal and amine, typically from about 0.005 to 1.5% by weight of metal, from about 0.1 to about 5.0% by weight of amine and minor amounts of other materials, such as various promoters, by-products, unreacted monomer, and the like. Such reaction solutions are then treated further, for example, with chelating agents and intrinsic viscosity stabilizers, in accordance with the present invention.

A wide variety of chelating agents are effective in the present process, the choice being primarily dictated by economic considerations. They may be organic as well as inorganic in nature. In general, however, the preferred agents will comprise a polyfunctional carboxylic acid containing compound, such as sodium potassium tartrate, nitrilotriacetic acid, citric acid, glycine and especially preferably, they will be selected from polyalkylenepolyamine polycarboxylic acids, aminopolycarboxylic acids, aminocarboxylic acids, polycarboxylic acids and their alkali metal, alkaline earth metal or mixed alkali metal-alkaline earth metal salts. For example, the preferred agents will include ethylenediaminetetraacetic acid, hydroxyethylethylenediaminetriacetic acid, diethylenetriaminepentaacetic acid and their salts.

Special mention is made of ethylenediaminetetraacetic acid or a mono-, di-, tri and tetrasodium salt thereof and of nitrilotriacetic acid and its corresponding salts. In addition, polyamines, e.g., of the formula

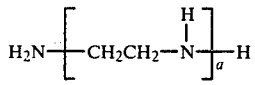

wherein a is an integer of from 1 to 5, such as diethylenetriamine or triethylenetetramine, can also be used as chelating agents. See copending U.S. patent application Ser. No. 428,450, filed Dec. 26, 1973, incorporated herein by reference.

Although relatively large amounts of the chelating agents can be used, e.g., from 0.1 mole to about 100 moles per mole of metal ion in the reaction solution, it is economically advantageous to select an amount which is sufficient to provide from about 0.5 to about 5.0 moles and preferably, about 1 to about 2 moles of chelating agent per gram-atom of metallic catalyst component. Water may be added at this time to insure separation of an aqueous phase.

After the addition of the chelating agent, the aqueous phase containing the chelated catalyst can be removed by decantation or, preferably, by centrifuging in a liquid-liquid centrifuge.

The heating step is carried out by heating the polyphenylene ether reaction solution at temperatures from about 140° to 190° F., preferably from about 150° to 180° F., for about fifteen minutes to three hours, preferably from about thirty minutes to one hour. Typically, the mixture is heated for thirty minutes at 180° F. or for one hour at 160° F.

In a preferred method, the catalyst is not separated from the reaction mixture before the heating step; chelating agents and stabilizers are added, the reaction mixture is heated, and then the catalyst is separated. This is advantageous with regard to convenience. Also, this procedure yields a crumbed product that results in compositions containing high impact polystyrene having somewhat better color and higher impact strength than those compositions containing polyphenylene ether resin wherein the catalyst was removed prior to heating.

According to the invention, heating takes place in the presence of an intrinsic viscosity stabilizer. Intrinsic viscosity stabilization, i.e., molecular weight control of the polyphenylene ether, can be achieved by contacting the polyphenylene ether reaction solution with a dihydric phenol and a mild reducing agent. Suitable dihydric phenols, or mixtures thereof, are selected from the compounds of the formulae

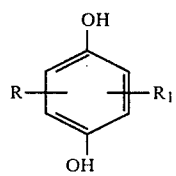

and

-continued

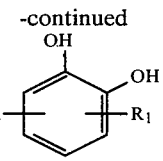

wherein R and R$_1$, which can be the same or different, each represent a hydrogen atom or an alkyl group of up to eight carbon atoms. Illustratively, the compounds will be hydroquinone, catechol, and their alkyl substituted derivatives, such as methylhydroquinone, propylhydroquinone, butyl hydroquinone, octylhydroquinone, dimethylhydroquinone, methyl catechol, dimethyl catechol, t-butyl catechol, and the like.

Mild reducing agents are generally suitable. A mild reducing agent is one which donates electrons readily but still is not capable of reducing the metallic ion catalyst component all of the way to the free metal under the conditions of the process. Illustrative reducing agents comprise sulfur suboxides, such as sulfur dioxide or sulfurous acid, sodium bisulfite, salts of metals in their lower valence states, such as tin (II) chloride, iron (II) sulfate, chromium (II) sulfate or titanium (III) chloride. Also suitable are nitrogen-containing reducing agents, such as hydroxylamines and their salts, and phosphites, such as diethylphosphite and mild organic reducing agents like glucose. Especially preferred is sodium sulfite.

Although relatively large amounts of the dihydric phenols can be used, it is desirably only to use enough to provide stabilization. The molar ratio of dihydric phenol to 2,6-xylenol (or other phenol used for the oxidative coupling) will be from about 1:10 to about 1:10,000, preferably from about 1:200 to about 1:1000. The mild reducing agent is preferably used in a molar ratio of reducing agent to 2,6-xylenol, or other phenol, of from about 1:5 to about 1:5000, preferably from about 1:50 to about 1:300.

As mentioned above, the catalyst may be removed from the polyphenylene ether reaction solution prior to heating. However, chelating agents may optionally be added to the reaction solution in combination with intrinsic viscosity stabilizers and water, and then, after heating, the reaction solution would be centrifuged to remove the metal chelate and water soluble products derived from the stabilizers.

The polyphenylene ether can then be isolated in crumb form from the remaining organic phase by addition, with vigorous stirring, to water maintained at a temperature sufficiently high to volatilize the reaction solvent. More specifically, the polymer composition and liquid medium is fed to a vessel such as a creased flask or a baffled tank having a high efficiency agitator and introduced slowly into a vigorously stirred mass of hot water. Small droplets are formed, and under steam-distillation conditions, the steam-distillable component in the liquid medium is vaporized and entrained in vapor distilling off the water which is at a suitable temperature, e.g., from 60° to 100° C., preferably from 80° to 100° C. In a short time the steam-distillable component will flash off of the droplets and the solvent-free polyphenylene ether resin will form discrete particles which assume the form of a friable crumb when the mixture is cooled at about 25° C. This is separated, e.g., by filtration, and then dried under a vacuum or at atmospheric pressure or higher at elevated temperature, such as 30° to 90° C. or higher. The product can be molded or otherwise formulated in known ways. Further details are set forth in commonly assigned U.S. patent application Ser. No. 311,837, filed Dec. 4, 1972.

Compositions comprising polystyrene or rubber-modified polystyrene and the crumbed polyphenylene ether resins produced according to the above, have physical properties comparable to those of similar compositions comprising methanol-precipitated polyphenylene ether resins. The color stability of compositions made with the crumbed resins is inferior to that of compositions made with the methanol-precipitated resins, and when color stability is important, the crumbing step should be preceded by a capping reaction. In one convenient method of capping the polyphenylene ether reaction solution is contacted with a capping agent in the presence of a water soluble base and a catalytic phase transfer agent.

In general, the capping agents that are employed are compounds which will react with a phenolic hydroxyl group with subsequent formation of a bond between the oxygen atom of the phenolic group and a hydrocarbyl-carbonyl group (derived from monoacyl halides or anhydrides of monocarboxylic acids) or a hydrocarbyl group (derived from alkyl halides or dialkyl sulfates). Representative useful capping agents are the following:

(A) monoacyl halides of the formula

(B) anhydrides of monocarboxylic acids of the formula

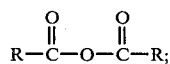

(C) alkyl halides of the formula $R_1$-X; and (D) dialkylsulfates of the formula $R_1$—O—SO$_2$—O—$R_1$, wherein R is alkyl, cycloalkyl, aryl, or mixtures thereof, such as alkaryl, alkcycloalkyl, aralkyl, arcycloalkyl, cycloalkaryl, etc., and X is chlorine, bromine, fluorine, or iodine. $R_1$ is alkyl or aralkyl, such as methyl and benzyl. Preferably, the R and $R_1$ groups contain from about 1 to about 30 carbon atoms, more preferably from about 1 to about 20 carbon atoms.

Representative examples of specific capping agents include:

(1) monoacyl halides, such as acetyl fluoride, acetyl chloride, acetyl bromide, propionyl halides, butyryl halides, stearoyl halides, benzoyl halides, toluyl halides, naphthoyl halides, cinnamoyl halides, etc;

(2) anhydrides of monocarboxylic acids, such as acetic anhydride, propionic anhydride, octanoic anhydride, benzoic anhydride, toluic anhydride, butyric anhydride, pivalic anhydride, m-dichlorobenzoic anhydride, 2,3,4,5,6-pentachlorobenzoic anhydride, pentanoic anhydride, palmitic anhydride, stearic anhydride, etc.;

(3) alkyl halides, such as: methyl chloride, methyl bromide, methyl iodide, amyl halides, hexadecyl halides, benzyl chloride, etc.; and (4) dialkylsulfates, such as dimethyl sulfate, diethyl sulfate, dibutyl sulfate, diisoamyl sulfate, didodecyl sulfate, di(octadecyl)sulfate, etc.

As pointed out by the foregoing specific examples, the particular capping agent employed is not critical. A presently preferred capping agent is acetic anhydride since it is a readily available, inexpensive capping agent.

The base can be any water soluble base which can be dissolved in any aqueous phase present in the polyphenylene oxide reaction mixture or added in aqueous solution to the mixture in amounts adequate to provide sufficient hydroxyl groups within the organic phase to form an alkali metal or alkaline earth metal cation phenoxide. Preferably, the bases that are employed are those that are very soluble in aqueous media. Among the water soluble base compounds that can be employed are alkali metal or alkaline earth metal hydroxides and carbonates. Specific examples include compounds such as potassium, sodium hydroxide, sodium carbonate, etc.

The catalytic phase transfer agents which can be employed comprise certain ionic compounds which are soluble in the organic phase of a polyphenylene oxide reaction mixture. Among the catalytic phase transfer agents which are suitable are those selected from the group consisting of quaternary ammonium compounds, quaternary phosphonium compounds and tertiary sulfonium compounds, or mixtures thereof. These compounds can be described as the ammonium, phosphonium and sulfonium salts having the respective formulae

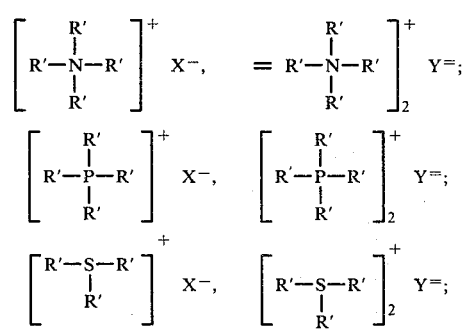

wherein each R' is independently selected from aliphatic hydrocarbon radicals having from about 1 to about 30 carbon atoms; each X$^-$ is selected from the group consisting of Cl$^-$, Br$^-$, F$^-$, CH$_3$SO$_3^-$, CH$_3$CO$_2^-$, CF$_3$CO$_2^-$ and OH$^-$; and each Y$^=$ is selected from the group consisting of SO$_4^=$, CO$_3^=$, and C$_2$O$_4^=$. Preferably the total number of carbon atoms in the compound will be between about 8 and about 50.

These onium compounds can be prepared by methods well known in the art which include the familar addition reactions of tertiary aliphatic amines, tertiary aliphatic phosphines and aliphatic sulfides with aliphatic halides.

Details regarding the capping reaction conditions are set forth in White, U.S. Pat. No. 4,048,143, incorporated herein by reference.

The term "polyphenylene ether" includes those polymers disclosed and claimed in Hay, U.S. Pat. No. 3,306,874 and 3,306,875, whenever produced by an oxidative coupling reaction comprising passing an oxygen-containing gas through a reaction solution of a phenol and a metal-amine complex catalyst. The term in its broadest sense includes various copolymers and compositions of the polyphenylene ethers formed by interpolymerization with other monomers or polymers, such as the polyolefins, polystyrenes, polycarbonates, and the like.

In general, the polyphenylene ether resins will be of the formula

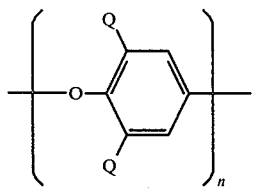

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene)ether.

The polyphenylene ether resin compositions prepared according to this invention may also contain an alkenyl aromatic resin or a rubber-modified alkenyl aromatic resin. The alkenyl aromatic resin should have at least 25% of its units derived from an alkenyl aromatic monomer of the formula

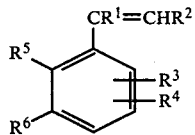

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, bromostyrene, chlorostyrene, α-methylstyrene, vinylxylene, divinylbenzene, vinyl naphthalene, and vinyltoluene.

The alkenyl aromatic monomer may be copolymerized with materials such as those having the general formula:

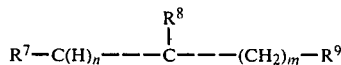

wherein the dotted lines each represent a single or a double carbon to carbon bond; $R^7$ and $R^8$ taken together represent a

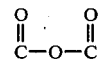

linkage; $R^9$ is selected from the group consisting of hydrogen, vinyl, alkyl of from 1 to 12 carbon atoms, alkenyl of from 1 to 12 carbon atoms, alkylcarboxylic of from 1 to 12 carbon atoms, and alkenylcarboxylic of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkenyl aromatic resins include, by way of example, homopolymers such as homopolystyrene and poly(monochlorostyrene), and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene-acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. Nos. 2,971,939, 3,336,267, and 2,769,804, all of which are incorporated herein by reference.

The alkenyl aromatic resins can be modified with rubbers. Among the rubbers which can be employed are natural and synthetic elastomers, such as diene rubbers, e.g., polybutadiene, polyisoprene, and the like. Moreover, the rubbers can comprise random, block, and interpolymers of conventional types, e.g., butadiene-styrene random copolymers and styrene-butadiene-styrene block copolymers. Preferred rubber-modified alkenyl aromatic resins will contain from about 4 to about 75% by weight of rubber based on the total weight of the rubber-modified alkenyl aromatic resin.

The alkenyl aromatic resin modified with a rubber may be prepared by dissolving the rubber in the alkenyl aromatic monomer and polymerizing the mixture, preferably in the presence of a free-radical initiator, until 90-100% by weight of the alkenyl aromatic monomer has reacted to form the rubber-modified alkenyl aromatic resin.

The polyphenylene ether resin and alkenyl aromatic resin or rubber-modified alkenyl aromatic resin are combinable in a fairly wide range of proportions. Preferably, the compositions produced according to this invention will comprise from about 1 to about 99 parts of polyphenylene ether resin and from about 99 to about 1 part of alkenyl aromatic resin or rubber-modified alkenyl aromatic resin.

The compositions produced according to the invention can also be mixed with other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus the tensile strength and the heat distortion temperature.

Although it is only necessary to have at least a reinforcing amount of the reinforcement present, in general, the filler will comprise from about 10 to about 90 percent by weight based on the weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80 percent by weight based on the total weight of glass and polymers and preferably from about 10 to about 50 percent by weight. Especially preferably the glass will comprise from about 10 to about 40 percent by weight based on the total weight of glass and polymers. Generally, for direct molding use, up to about 60 percent of glass can be present without causing flow problems. However, it is useful also to prepare the compositions containing substantially greater quantities, e.g., up to 70 to 80 percent by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about $\frac{1}{8}$" to about 1" long, preferably less than $\frac{1}{4}$" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastic compositions, as defined above, by including a flame-retardant additive in a minor proportion but in an amount at least sufficient to render the composition non-burning or self-extinguishing. The flame-retardant additives useful in this invention comprise a family of chemical compounds well known to those skilled in the art. Such flame-retardant additives include a halogenated organic compound, a halogenated organic compound in admixture with an antimony compound, elemental phosphorus, a phosphorus compound, compounds containing phosphorus-nitrogen bonds, or a mixture of two or more of the foregoing.

Among the useful halogen-containing compounds are substituted benzenes exemplified by tetrabromobenzene, hexachlorobenzene, hexabromobenzene, and biphenyls, such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing. Especially preferred are hexabromobenzene and chlorinated biphenyls or terphenyls, alone or mixed with antimony oxide.

The preferred phosphate is triphenyl phosphate. It is also preferred to use triphenyl phosphate in combination with hexabromobenzene and, optionally, antimony oxide. Especially preferred is a composition comprised of mixed triaryl phosphates with one or more isopropyl groups on some or all of the aryl rings, such as Kronitex 50 supplied by Food Machinery Corporation.

Other flame retardant additives are known to those skilled in the art. See, for example, Cooper et al, U.S. Pat. No. 3,943,191, incorporated herein by reference.

In general, however, the amount of additive will be from about 0.3 to 35 percent by weight based on the weight of the total composition. A preferred range will be from about 1 to 20 percent by weight, and an especially preferred range will be from about 3 to 15 percent by weight. Smaller amounts of compounds highly concentrated in the elements responsible for flame retardance will be sufficient, e.g., elemental red phosphorus will be preferred at about 0.5 to 10 percent by weight based on the weight of the total composition, while phosphorus in the form of triphenyl phosphate will be used at about 3 to 20 percent by weight, and so forth. Halogenated aromatics will be used at about 2 to 18 percent by weight, and synergists, e.g., antimony oxide, will be used at about 1 to 10 percent by weight based on the weight of the total composition.

Compositions containing polyphenylene ether resin and filler and/or flame retardant additive, or optionally containing alkenyl aromatic resin or rubber-modified alkenyl aromatic resin, may be formed by conventional techniques, that is, by first dry mixing the components to form a premix, and then passing the premix through an extruder at an elevated temperature, e.g., 425° to 640° F. Compounding should be carried out to insure that the residence time in the machine is short; that the temperature is carefully controlled, that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLE I

Polymerization with Crumbing Step

Four gallons of toluene was added to a ten-gallon reactor equipped with a turbine stirrer and an oxygen inlet tube near the bottom of the vessel. Catalyst was prepared by adding 40.7 g of bromine over a period of fifteen minutes to a slurry of 3.73 g of cuprous oxide and 52.1 g of 2,6-xylenol in 200 ml of methanol. The product was diluted to 300 ml and added to the reactor with 55 g of di-n-butylamine, 105.6 g of butyldimethylamine, 5.5 g of methyltrioctylammonium chloride, 8.97 g of N,N'-di-tert-butylethylenediamine, and 3130 ml of methanol containing 5.5% water. The mixture was stirred vigorously, oxygen was introduced at a rate of 50 cu. ft./hr., and a solution of 12.2 lbs. of 2,6-xylenol and 8.97 g of the diamine in 12.2 lbs. of toluene was added over a period of thirty minutes. The temperature was maintained at 105° F. for the first sixty minutes and then increased to 120° F., for the remainder of the reaction.

After 80 minutes, the oxygen was shut off, the vessel was purged with nitrogen, and 2000 ml of water, 97 g of a 38% aqueous solution of the trisodium salt of ethylenediamine tetracetic acid, and two gallons of toluene were added. The mixture was stirred for fifteen minutes and centrifuged in a liquid-liquid centrifuge. The organic phase was separated into two portions, and the polymer, poly(2,6-dimethyl-1,4-phenylene)ether (PPO), was isolated from the first portion by addition of approximately two volumes of methanol. Polymer was isolated from the second portion by forcing it through a spray nozzle into approximately five gallons of water which were vigorously stirred and heated by direct addition of steam at a temperature high enough to distill off the toluene. The granular precipitate was filtered off, washed with water, and dried in a vacuum oven.

EXAMPLE II

Heating

Polymer was prepared following the procedure of Example I. After centrifuging to remove the catalyst and excess chelating agent as in Example I, a small sample was withdrawn and precipitated in methanol. The polymer had an intrinsic viscosity of 0.47 dl/g measured in chloroform solution at 30° C.

The remainder of the mixture was heated for 30 minutes at 180° F., and the polymer was isolated as described in Example I. The intrinsic viscosity of the product was 0.41 dl/g.

EXAMPLE III

Heating with I.V. Stabilization

Polymer was prepared according to Example I. After centrifuging to remove the catalyst, a sample was precipitated in methanol. The polymer had an intrinsic viscosity of 0.48 dl/g.

The remainder of the mixture was stirred with 11.5 g of hydroquinone, 33 g of sodium sulfite, and 250 ml of water and then was heated for 30 minutes at 180° F. The polymer was isolated as described in Example I. It had an intrinsic viscosity of 0.48 dl/g, unchanged during the heating.

EXAMPLE IV

Heating with I.V. Stabilization

Polymer was prepared as described in Example I. After addition of the chelating agent, a sample was withdrawn and precipitated with methanol. The polymer had an intrinsic viscosity of 0.50 dl/g. The remainder of the mixture was stirred with 11.5 g of hydroquinone and 33 g of sodium sulfite and was heated for one hour at 160° F. The mixture was then centrifuged, and the polymer was isolated as in Example I.

EXAMPLE V

Capping

The procedure described in Example III was carried out. After heating at 180° F., the mixture was cooled to 140° F. Then 20.1 g of methyltrioctylammonium chloride and 124 g of 49% sodium hydroxide were added, and the mixture was vigorously stirred while 153.6 g of acetic anhydride, diluted to 300 ml with toluene, was added over a period of thirty minutes. One liter of water was then added, the mixture was centrifuged, and the polymer was isolated as described in Example I.

EXAMPLE VI

The procedure described in Example IV was carried out. After heating at 160° F., the mixture was cooled to 140° F. and centrifuged. The organic phase was separated, 22.2 g of methyltrioctylammonium chloride and 136 g of 49% sodium hydroxide were added, and then, with vigorous stirring, 168.8 g of acetic anhydride diluted to 300 ml with toluene were added over thirty minutes. The mixtures was stirred with 1000 ml of water and then centrifuged, and the polymer was isolated as described in Example I.

The colors of the polymers isolated in these examples are shown in Table 1, below. Color numbers were obtained by measuring the light transmission at 444 millimicrons of a 2% solution in chloroform using a Coleman 295 spectrophotometer. The color number is defined as (100-percent transmittance)/10. Hydroxyl content of the polymers was estimated by comparing the absorbance of the phenolic hydroxyl group at 2770 nm, using a Beckman DK-2A spectrometer with that of a standard solution of 2,6-xylenol.

| Ex. | Method of Isolation | Color No. | Hydroxyl Content (Wt. %) | Heating | Stab. | Capping |
| --- | --- | --- | --- | --- | --- | --- |
| C-1* | MeOH | 1.0 | 0.018 | No | No | No |
| I | Crumb | 9.5 | 0.027 | No | No | No |
| C-2* | MeOH | 1.3 | 0.025 | Yes | No | No |
| II | Crumb | 3.5 | 0.025 | Yes | No | No |
| C-3* | MeOH | 0.6 | 0.049 | Yes | Yes | No |
| III | Crumb | 5.0 | 0.124 | Yes | Yes | No |
| C-4* | MeOH | 0.6 | 0.033 | Yes | Yes | No |
| IV | Crumb | 5.8 | 0.172 | Yes | Yes | No |
| C-5* | MeOH | 1.0 | 0.014 | Yes | Yes | Yes |
| V | Crumb | 3.2 | 0.014 | Yes | Yes | Yes |
| C-6* | MeOH | 0.4 | 0.010 | Yes | Yes | Yes |
| VI | Crumb | 2.2 | 0.017 | Yes | Yes | Yes |

*Control

The results in Table 1 show that polyphenylene ether resin isolated by crumbing after heating with a stabilizer (Examples III and IV) has color numbers higher than polymers isolated by crumbing after heating without the stabilizer (Example II) but much better than those of PPO resins crumbed without heating (Example I).

Compositions containing polyphenylene ether resins prepared according to the above examples were prepared with the following compositions:

| Polyphenylene ether resin | 55 parts |
|---|---|
| FG 834* | 45 parts |
| Triphenyl phosphate | 3 parts |
| Tridecyl phosphite | 1 part |
| Titanium dioxide | 5 parts |
| Zinc sulfide | 0.15 part |
| Zinc oxide | 0.15 part |

*Polybutadiene modified polystyrene available from Foster Grant

The compositions were extruded under standard conditions in a 28 mm twin screw extruder, and standard test bars were prepared by molding in a 3 oz. Newbury screw injection molding machine. Properties of the compositions are summarized in Table 2, below.

TABLE 2

| Ex. | Isolation | Izod Impact (ft.lb./in. of notch) | Gardner Impact (in.lbs.) | Yellowness Index | Time to Embrittlement (days at 115° C.) |
|---|---|---|---|---|---|
| C-1* | MeOH | 4.2 | 325 | 19.1 | 35–38 |
| I | Crumb | 3.0 | 325 | 23.3 | 21–25 |
| C-2* | MeOH | 2.9 | 140 | 20.1 | 18–21 |
| II | Crumb | 2.9 | 140 | 21.1 | 18–21 |
| C-3* | MeOH | 3.0 | 200 | 14.8 | 32–35 |
| III | Crumb | 3.8 | 325 | 17.2** | 35–38 |
| C-4* | MeOH | 3.9 | 275 | 14.6 | 28–32 |
| IV | Crumb | 4.5 | 275 | 16.2** | 35–39 |
| C-5* | MeOH | 3.7 | 225 | 15.4 | 35–39 |
| V | Crumb | 3.8 | 265 | 18.3 | 35–39 |
| C-6* | MeOH | 4.4 | 325 | 12.1 | 46–49 |
| VI | Crumb | 4.4 | 325 | 15.3 | 50–60 |

*control
**color unstable, changes on standing.

It can be seen from the above that compositions made from PPO isolated by crumbing after heating with stabilizer present, but without capping, have Izod and Gardner impact strength substantially better than compositions from PPO heated without stabilizer, and comparable to compositions from PPO isolated by methanol precipitation without heating. Surprisingly, Izod impact strength of compositions with PPO isolated by crumbing after heating with stabilizer is better than when the PPO is isolated by methanol precipitation after the same treatment.

Compositions made with PPO isolated by crumbing after heating in the presence of stabilizers, but without capping, have better thermal-oxidative stability (time to embrittlement) than those from PPO heated without stabilizer or isolated by crumbing with no thermal treatment. Stability is as good as that of the control isolated by methanol precipitation without heating. This is especially surprising in view of the high concentration of phenolic hydroxyl groups in these polymers, as previous studies have shown that the stability of PPO alone decreases with increasing hydroxyl content.

The initial color of the compositions from PPO isolated by crumbing after heating with stabilizers, without capping, was better than that of compositions made with PPO isolated by either method with no thermal treatment or heated without stabilizer. This is unexpected, as the PPO itself (Examples III and IV) had higher color than Example II or Control Example C-1 or C-2.

The color stability of a composition comprised of PPO isolated by crumbing after heating with stabilizers, followed by a capping step, was the same as that of a composition comprised of polymer similarly treated and isolated by methanol precipitation. It was better than that of material heated without stabilizer, and equivalent to the methanol-precipitated Control Example C-1. Surprisingly, the compositions showed complete color stability over a period of more than a year, even though only a partial capping was achieved.

Most properties were somewhat better, both in the capped and uncapped versions, when the catalyst was left in the mixture during the heating step, instead of being removed first. Compare Examples IV and III and Examples VI and V.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. In a process for forming a polyphenylene ether by an oxidative coupling reaction in the presence of a metal-amine complex catalyst comprising passing an oxygen-containing gas through a reaction solution of a phenol and said metal-amine catalyst in a steam-distillable reaction solvent, said reaction solution being capable of liquid-liquid extraction with an aqueous solution, and terminating the reaction and separating the metal-amine catalyst residue from the reaction solution and then recovering the polyphenylene ether, the improvement which comprises:

(a) removing the catalyst from the reaction solution;
(b) heating the reaction solution sufficiently in the presence of an intrinsic viscosity stabilizer comprising a dihydric phenol and a mild reducing agent selected from the group of sulfur dioxide, sulfurous acid, sodium bisulfite, sodium thionite, tin (II) chloride, iron (II) sulfate, chromium (II) sulfate, titanium (III) chloride, hydroxylamines and their salts and diethyl phosphite; and
(c) adding the reaction solution into vigorously agitated hot water to produce a dispersion of fine droplets of the reaction solution in the hot water, continuing the vigorous agitation until the solvent in the droplets has been substantially completely steam-distilled off leaving solvent-free particles of said polyphenylene ether suspended in the hot water, and thereafter collecting the polyphenylene ether in the form of a friable crumb.

2. In a process for forming a polyphenylene ether by an oxidative coupling reaction in the presence of a metal-amine complex catalyst comprising passing an oxygen-containing gas through a reaction solution of a phenol and said metal-amine catalyst in a steam-distillable reaction solvent, said reaction solution being capable of liquid-liquid extraction with an aqueous solution, and terminating the reaction and separating the metal-amine catalyst residue from the reaction solution, and then recovering the polyphenylene ether, the improvement which comprises:

(a) removing the catalyst from the reaction solution;
(b) heating the reaction solution sufficiently in the presence of an intrinsic viscosity stabilizer comprising a dihydric phenol and a mild reducing agent selected from the group of sulfur dioxide, sulfurous acid, sodium bisulfite, sodium thionite, tin (II) chloride, iron (II) sulfate, chromium (II) sulfate, titanium (III) chloride, hydroxylamines and their salts and diethyl phosphite; and (c) contacting the reaction solution from step (b) with a capping agent selected from the following:

(A) monoacyl halides of the formula

(B) anhydrides of monocarboxylic acids of the formula

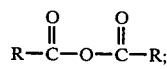

(C) alkyl halides of the formula $R_1$—X; and (D) dialkylsulfates of the formula $R_1$—O—$SO_2$—O—$R_1$, wherein R is alkyl, cycloalkyl, aryl, alkaryl, alkcycloalkyl, aralkyl, arcycloalkyl, or cycloalkaryl, containing from about 1 to about 30 carbon atoms, and X is chlorine, bromine, fluorine, or iodine, and $R_1$, is alkyl or aralkyl, containing from about 1 to about 30 carbon atoms in the presence of a water soluble base, and a catalytic phase transfer agent;

(d) adding the reaction solution to vigorously agitated hot water to produce a dispersion of fine droplets of the reaction solution in the hot water, continuing the vigorous agitation until the solvent in the droplets has been substantially completely steam-distilled off leaving solvent-free particles of said polyphenylene ether suspended in the hot water, and thereafter collecting the polyphenylene ether in the form of a friable crumb.

3. In a process for forming a polyphenylene ether by an oxidative coupling reaction in the presence of a metal-amine complex catalyst comprising passing an oxygen-containing gas through a reaction solution of a phenol and said metal-amine catalyst in a steam-distillable reaction solvent, said reaction solution being capable of liquid-liquid extraction with an aqueous solution, and terminating the reaction and separating the metal-amine catalyst residue from the reaction solution and then recovering the polyphenylene ether, the improvement which comprises:

(a) heating the reaction solution in the presence of an intrinsic viscosity stabilizer comprising a dihydric phenol and a mild reducing agent selected from the group of sulfur dioxide, sulfurous acid, sodium bisulfite, sodium thionite, tin (II) chloride, iron (II) sulfate, chromium (II) sulfate, titanium (III) chloride, hydroxylamines and their salts and diethyl phosphite and a chelating agent for the metal component of the catalyst;

(b) centrifuging the reaction solution from step (a) to remove the catalyst and water soluble products; and (c) adding the reaction solution to vigorously agitated hot water to produce a dispersion of fine droplets of the reaction solution in the hot water, continuing the vigorous agitation until the solvent in the droplets has been substantially completely steam-distilled off leaving solvent-free particles of said polyphenylene ether suspended in the hot water, and thereafter collecting the polyphenylene ether in the form of a friable crumb.

4. In a process for forming a polyphenylene ether by an oxidative coupling reaction in the presence of a metal-amine complex catalyst comprising passing an oxygen-containing gas through a reaction solution of a phenol and said metal-amine catalyst in a steam-distillable reaction solvent, said reaction solution being capable of liquid-liquid extraction with an aqueous solution, and terminating the reaction and separating the metal-amine catalyst residue from the reaction solution, and then recovering the polyphenylene ether, the improvement which comprises:

(a) heating the reaction solution sufficiently in the presence of an intrinsic viscosity stabilizer comprising a dihydric phenol and a mild reducing agent selected from the group of sulfur dioxide, sulfurous acid, sodium bisulfite, sodium thionite, tin (II) chloride, iron (II) sulfate, chromium (II) sulfate, titanium (III) chloride, hydroxylamines and their salts and diethyl phosphite and a chelating agent for the metal component of the catalyst;

(b) centrifuging the reaction solution from step (a) to remove the catalyst and water soluble products;

(c) contacting the reaction solution from step (b) with a capping agent selected from the following:

(A) monoacyl halides of the formula

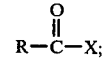

(B) anhydrides of monocarboxylic acids of the formula

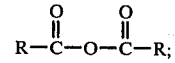

(C) alkyl halides of the formula $R_1$—X; and (D) dialkylsulfates of the formula $R_1$—O—$SO_2$—O—$R_1$, wherein R is alkyl, cycloalkyl aryl, alkaryl, alkcycloalkyl, aralkyl, arcycloalkyl, or cycloalkaryl, containing from about 1 to about 30 carbon atoms, and X is chlorine, bromine, fluorine, or iodine, and $R_1$, is alkyl or aralkyl, containing from about 1 to about 30 carbon atoms in the presence of a water soluble base, and a catalytic phase transfer agent; and (d) adding the reaction solution to vigorously agitated hot water to produce a dispersion of fine droplets of the reaction solution in the hot water, continuing the vigorous agitation until the solvent in the droplets has been substantially completely steam-distilled off leaving solvent-free particles of said polyphenylene ether suspended in the hot water, and thereafter collecting the polyphenylene ether in the form of a friable crumb.

5. The process of claim 1 or 2 wherein the reaction solution from step (a) is centrifuged to remove an aqueous phase containing a metal chelate.

6. The process of claim 3 or 4 wherein the chelating agent is a polyfunctional carboxylic acid containing compound.

7. The process of claim 6 wherein the polyfunctional carboxylic acid containing compound is selected from the group of sodium potassium tartrate, nitrilotriacetic acid, citric acid, glycine, polyalkylenepolyamine polycarboxylic acids, aminopolycarboxylic acids, aminocarboxylic acids, polycarboxylic acids and their alkali metal, alkaline earth metal or mixed alkali metal-alkaline earth metal salts.

8. The process of claim 6 wherein the polyfunctional carboxylic acid containing compound is selected from the group of hydroxyethylethylenediaminetriacetic acid, and diethylenetriaminepentaacetic acid and the salts thereof; ethylenediaminetetraacetic acid and nitrilotriacetic acid and the mono-, di-, tri- and tetrasodium salts thereof; and polyamines of the formula

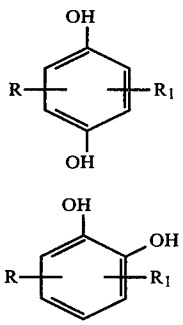

wherein a is an integer of from 1 to 5.

9. The process of claim 1, 2, 3 or 4 wherein the dihydric phenol is selected from the compounds of formulae

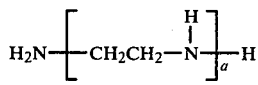

and wherein R and $R_1$, which can be the same or different, each represent a hydrogen atom or an alkyl group of up to eight carbon atoms.

10. The process of claim 9 wherein the dihydric phenol is selected from the group of hydroquinone, catechol, and their alkyl substituted derivatives.

11. The process of claim 10 wherein the dihydric phenols are selected from the group of methylhydroquinone, propylhydroquinone, butyl hydroquinone, octylhydroquinone, dimethylhydroquinone, methyl catechol, dimethyl catechol, and t-butyl catechol.

12. The process of claim 1, 2, 3, or 4 wherein the reaction solution is heated for thirty minutes at 180° F.

13. The process of claim 1, 2, 3, or 4 wherein the reaction solution is heated for one hour at 160° F.

14. The process of claim 2 or 4 wherein the water soluble base is selected from the alkali metal or alkaline earth metal hydroxides and carbonates.

15. The process of claim 2 or 4 wherein the catalytic phase transfer agent is selected from the quaternary ammonium compounds, quaternary phosphonium compounds and tertiary sulfonium compounds, and mixtures thereof.

16. The process of claim 15 wherein the catalytic phase transfer agent is selected from the ammonium, phosphonium, and sulfonium salts of the formulae

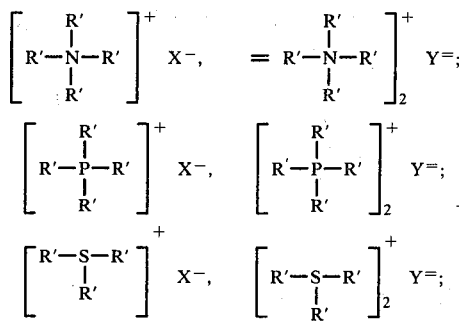

wherein each R' is independently selected from aliphatic hydrocarbon radicals having from about 1 to about 30 carbon atoms; each $X^-$ is selected from the group of $Cl^-$, $Br^-$, $F^-$, $CH_3SO_3^-$, $CH_3CO_2^-$, and $OH^-$; and each $Y^=$ is selected from the group of $SO_4^=$, $CO_3^=$, and $C_2O_4^=$.

17. A thermoplastic molding composition comprising polyphenylene ether resin prepared according to the process of claim 1, 2, 3, or 4.

18. The thermoplastic molding composition of claim 17 wherein the polyphenylene ether resin is selected from compounds of the formula

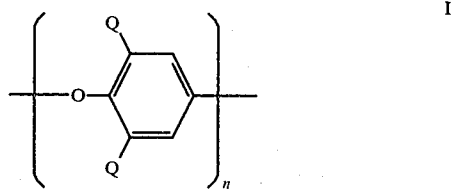

wherein the oxygen ether atom of one unit is connected to the benzene nucleus of the next adjoining unit, n is a positive integer and is at least 50, and each Q is a monovalent substituent selected from the group consisting of hydrogen, halogen hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

19. The composition of claim 18 wherein the polyphenylene ether is poly(2,6-dimethyl-1,4-phenylene) ether.

20. The termoplastic molding composition of claim 17 wherein the composition additionally comprises an alkenyl aromatic resin or a rubber-modified alkenyl aromatic resin.

21. The thermoplastic molding composition of claim 17 wherein the composition includes a reinforcing amount of an inorganic reinforcing filler.

22. The thermoplastic molding composition of claim 17 wherein the composition includes a flame-retardant amount of a flame-retardant additive.

* * * * *